Patented Dec. 11, 1923.

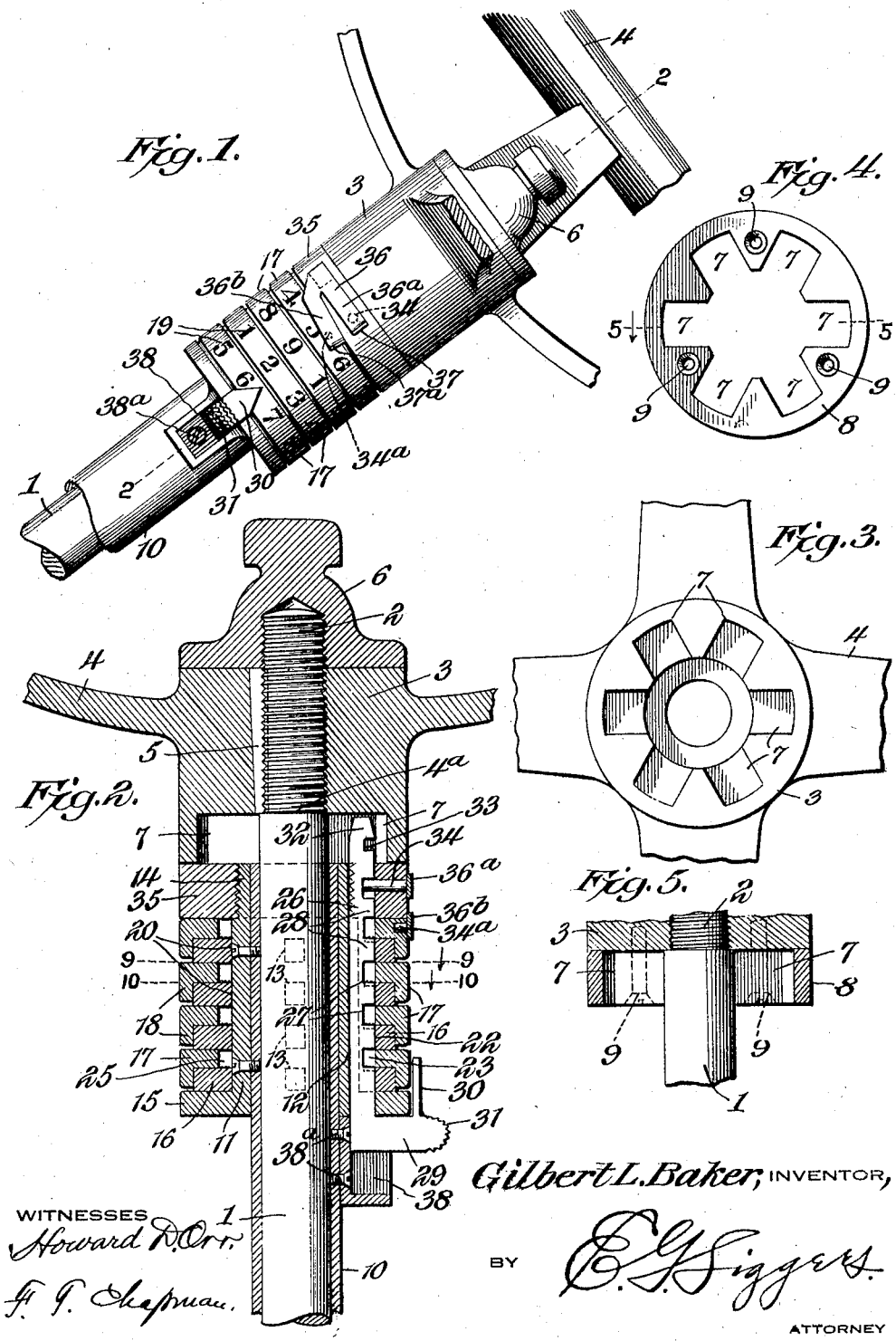

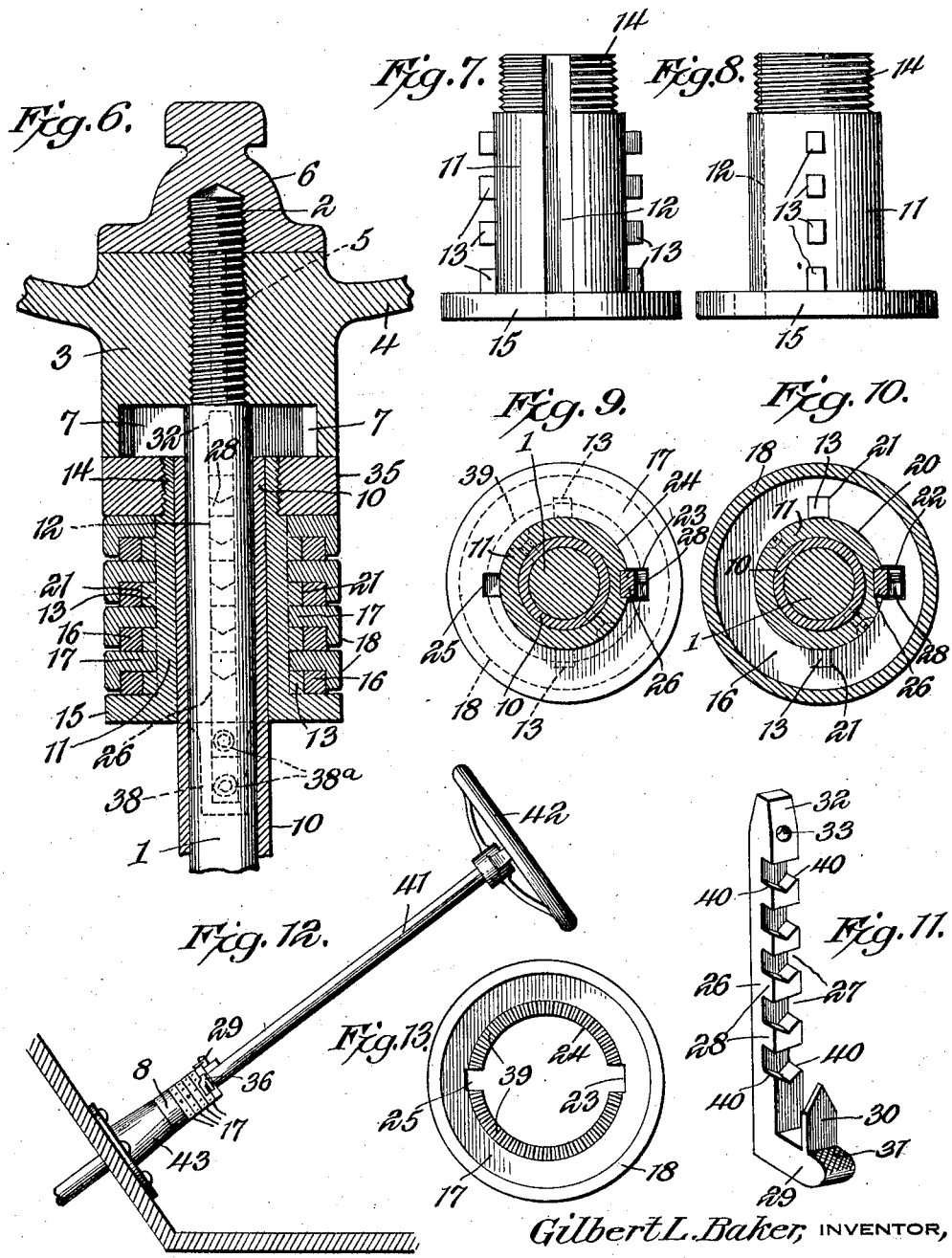

1,477,026

UNITED STATES PATENT OFFICE.

GILBERT LINCOLN BAKER, OF OAKDALE, CALIFORNIA.

LOCK FOR AUTOMOBILES.

Application filed January 31, 1921. Serial No. 441,304.

*To all whom it may concern:*

Be it known that I, GILBERT L. BAKER, a citizen of the United States, residing at Oakdale, in the county of Stanislaus and State of California, have invented a new and useful Improvement in Locks for Automobiles, of which the following is a specification.

This invention has reference to locks for automobiles, and is designed to provide a lock which may be attached to and form part of the steering post, whereby the steering wheel may be locked to or released from the post, without marked change in the steering mechanism of the automobile and in most part necessitating only the application of additional features readily attachable to standard parts of the steering post and wheel in a manner whereby the lock may be set to prevent turning of the steering wheel and, therefore, operation of the steering mechanism of the automobile, or may be unlocked so that the vehicle may be steered in the usual manner.

The invention contemplates the employment of a tubing or casing, such as is used to house the steering post or spindle standard to the automobile and occupying a position below the steering wheel hub, and fixed to the casing below the steering wheel hub is a tubular core carrying coacting fixed and rotatable lock elements of the permutation type, together with an adjustable lock bolt for coupling the lock elements to a fixed part of the steering post or casing therefor, except when the permutation elements are moved into a certain combination permitting the adjustment of the lock bolt, whereby it becomes possible to release the steering wheel for steering purposes.

Provision is made for the ready dismantling of the lock structure should it be found necessary to take the structure apart for repairs or other purposes.

The invention is designed more particularly for heavier types of automobiles, including auto trucks, where a particularly sturdy mechanism is desirable.

The invention will be best understood from a consideration of the following detailed description taken in connection with the accompanying drawings, forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings:

Fig. 1 is an elevation, with some parts broken away, of a lock for automobiles embodying the invention.

Fig. 2 is a longitudinal diametric section, with some parts in elevation, of the structure shown in Fig. 1 and drawn on a larger scale.

Fig. 3 is an inverted plan view of the steering wheel, showing locking sockets or keepers in the under face of the steering wheel hub for receiving a lock bolt coacting with the locking elements.

Fig. 4 is a bottom plan view of an alternate form of the structure shown in Fig. 3, where a socket ring is employed to replace that portion of the hub provided with sockets or keepers.

Fig. 5 is a section on the line 5—5 of Fig. 4.

Fig. 6 is a longitudinal section of the steering wheel hub and of the locking elements associated therewith and taken in a plane at substantially right angles to the showing of Fig. 2.

Fig. 7 is an elevation of a core structure made fast to the steering post casing or tubing.

Fig. 8 is a view similar to Fig. 7, but showing the side thereof at right angles to that seen in Fig. 7.

Fig. 9 is a section on the line 9—9 of Fig. 2.

Fig. 10 is a section on the line 10—10 of Fig. 2.

Fig. 11 is a perspective view of a slidable lock bolt associated with the lock members of the permutation lock.

Fig. 12 is an elevation of a steering post assembly in which the lock is located a short distance above the slanting footboard of the automobile instead of being located immediately below the steering post, as in Figs. 1, 2 and 6.

Fig. 13 is a bottom plan view of one of the tumblers.

In the drawings, there is shown a steering post 1 terminating at the upper end in a screw-threaded stem 2 to receive the hub 3 of a steering wheel 4, which may follow the usual lines of steering wheels in numerous types of automobiles, wherefore no extended showing or description of the steering wheel is deemed necessary.

The hub 3 is applied to the post 1 by screwing it on the threaded extension 2, until it seats on a shoulder 4ᵃ where the threaded extension 2 emerges from the post 1 and then the wheel is made fast to the steering post by a key 5 engaging matching slots in the hub and threaded extension in the usual manner. The steering wheel is further secured to the steering post by means of a nut 6 applied to the threaded extension 2, which is made long enough to project through the hub 3 to receive the nut and the latter may be made of ornamental form to provide a finish to the structure.

In the under end or face of the hub 3, there is formed a circular series of sockets or keepers 7, which may be produced in the steering wheel furnished with the automobile, especially when the lock is applied to the automobile when the latter is built. When the lock is made a part of the standard equipment of the automobile, the steering wheel may be initially provided with the sockets 7 or, in case the initial diameter of the hub 3 is deficient in stock to permit the production of the sockets 7 without danger of weakening the structure, a separate socket member 8 is provided with the sockets or keepers 7 formed therein and this member 8 is applied to the under surface of the hub 3 and secured thereto by screws 9 or in other appropriate manner, the separate socket member 8 being shown in Figs. 4 and 5.

In the structure shown in Figs. 2 and 6, the steering post or shaft is contained in a sleeve or casing 10 fast at the lower end to the footboard or flooring of the automobile, and surrounding and fast to the casing 10 is a tubular core 11 having a longitudinal exterior groove 12, and at diametrically opposite points in right angular relation to the groove 12, the core is provided with a longitudinal series of spaced lugs 13. At one end of the core, this constituting the upper end in the assembly, the core is reduced in diameter and externally screw-threaded, as shown at 14, the groove 12 extending through the screw-threads. At the end of the core remote from the screw-threads 14 is an annular base 15 in the form of an outstanding flange, traversed by the groove 12, so that such groove opens through the lower face of the base.

Applied to the core 11 is a series or pile of alternately arranged rings 16 and rotatable tumblers 17, the latter having peripheral axial flanges 18, of an axial extent to substantially enclose the peripheries of the rings 16. The tumblers 17 are provided with exposed faces including the flanges 18 and produced upon these exposed faces are numbers 19 or other appropriate indicia, whereby combinations may be displayed after the manner of permutation locks.

The lock structure comprises a suitable number of rings 16 and tumblers 17 enclosing the rings, with the assembly or pile of alternate rings and tumblers carried by the flange 15. Each stationary ring has a central opening 20 fitting snugly, yet freely, over the core 11, and entering the opening 20 are diametrically opposite slots or recesses 21 adapted to pass over the lugs 13 and receive them whereby to hold the rings 16 against rotation about the core, the thickness of each ring 16 and the thickness of the tumbler 17 spacing the rings 16 apart, so that the lugs 13 are seated in the slots 21.

Each stationary ring 16 is provided with another slot or recess 22 in about a 90° relation to the slots 21 in the particular showing of the drawings. Each tumbler 17 is provided with a slot or recess 23 entering a centrally located opening 24 of a size to pass over the core 11, and, at a point diametrically opposite to the slot or recess 23, is provided with another slot or recess 25 similar to the slot 23, but of smaller size. The slot 22 of each stationary ring 16 is of a size to pass the lock bolt 26, the latter being of rectangular or other cross section and in one face of the lock bolt there is produced a series of recesses 27 forming lugs or teeth 28 between them. At what constitutes the bottom end of the bolt 26 is a lateral projection 29 constituting a finger hold, and carried by the projection 29 is a pointer 30 so positioned as to face and ride over the lowermost tumbler 17. To facilitate the handling of the bolt 26, the projection 29 is milled or roughened as shown at 31. The other end of the bolt, indicated at 32, is tapered or otherwise formed to readily enter a socket or keeper 7 which may be in its path. The end 32 is provided with a perforation or recess 33, designed to receive a pin 34 (see Fig. 2), carried by a ring 35 screwed onto the threaded extension 14 of the core. The pin is given a normal inward trend by means of a spring 36, which may be a flat spring and is carried at one end by the ring 35 and at the other end is fast to the pin 34.

The spring 36 is suitably shaped to provide an extremity 37 readily engaged by the thumb or finger-nail of the operator, whereby the pin 34 may be withdrawn against the action of the spring to release the pin 34 from locking engagement in the socket 33 or in the recess 27 immediately below it. The pin 34 will hold the bolt 26 either with the end 32 raised into a socket or keeper 7, thus holding the steering wheel against manipulation, (see Fig. 9), or will hold the bolt 26 in a position where the end 32 is withdrawn from a socket or keeper 7, thus permitting rotation of the steering wheel in the usual manner for steering.

The spring 36 has two legs 36$^a$ and 36$^b$, of which the spring leg 36$^a$ engages the pin 34, while the spring leg 36$^b$ carries another pin 34$^a$ in position to enter a tumbler, which may be the uppermost one of the tumblers 17, and the spring leg or branch 36$^b$ is provided at its free end with an extremity 37$^a$ for a like purpose to that of the extremity 37 of the spring leg or branch 36$^a$. By this means the bolt 26 may be held in the locking position by the pin 34 on the entrance of the pin in a notch 27 of the lock bolt, or at the other limit of its travel by engaging in the recess 33.

The sockets or recesses 23 and 25 in each tumbler 17 permit the assembly of the tumblers with respect to the core 11, since the two opposite sockets, although of different sizes, will both pass the lugs 13, and the recesses 23 will pass the locking bolt 26 being large enough for the purpose. The recesses 21 and 22 in the stationary ring are properly spaced and of proper size to pass the lugs 13 and the locking bolt 26. In assembling the structure, the core is applied to the casing 10 and made fast thereto by screws 38$^a$ passed through the walls of the core and into the casing or tube 10. Then a stationary ring 16 is slipped over the core with the slots or recesses 21 in position to pass over the lugs 13 and the recess 22 coinciding with the slot 12, until the stationary ring finally rests upon the flange or ledge 15 where it is held against rotation by engagement with the lowermost lugs 13 in the recesses 21. Then there follows a tumbler 17 applied to the core by having the recesses 23 and 25 coinciding with the lugs 13 until the tumbler rests upon the lowermost stationary ring 16, in which position the tumbler may be rotated because of the spaces between the superposed lugs. The tumbler is then rotated until the recess 23 coincides with or matches the slot 12. In this manner the stationary rings or tumblers are assembled in alternation on the core until the uppermost tumbler is located just below the ring 35 with sufficient clearance to prevent binding. Then the hub 3 of the steering wheel is screwed onto the extension 2 and the key 5 is introduced, after which the cap nut 6 is placed in position.

By initially placing all the tumblers and stationary rings with the proper slots in alinement, the bolt 26 previously introduced may be locked against longitudinal movement by turning one or more of the tumblers, so that these tumblers traverse one or more of the recesses 27. The lock bolt 26 is held in locked position by breaking the combination for unlocking, so that unlocking is accomplished only by re-establishing the combination after the manner of a permutation lock.

In order to limit the movement of the lock bolt toward the unlocking position, there is made fast to the casing 10 beneath the lock bolt and in the path of the latter, a guide or pocket 38 secured to the casing or tubing 10 by screws 38$^a$ or otherwise, so as to prevent accidental loss of the bolt 26.

As a safeguard against ascertaining the proper combination to move the tumblers 17 to the unlocked position, the inner edge of one face of the web of each tumbler 17, or of some of them, is provided with a circular series of teeth or serrations 39 (see Fig. 13). This portion of the web of the tumbler is so located as to travel through a respective slot or recess 27 of the bolt in engagement with opposite edges 40 formed by grooving one wall of the notch 27, thereby forming spaced teeth corresponding in spacing to the width of a recess 23. With such an arrangement, if it be attempted to ascertain the position of a recess 23 in the tumbler 17, the multitude of grooves or serrations 39 will render it impossible to ascertain by the riding of the serrations over the edges 40 where such recesses, as the recess passing the bolt, may occur. In this manner, an attempt to pick the lock, by the sense of touch or "feel" is defeated.

In some forms of automobiles, there is provided a heavy steering post 41 (Fig. 12) surmounted by a steering wheel 42, but the post 41 is not enclosed in a casing such as the casing 10. The steering post 41 is passed through the footboard or flooring and surrounded and braced by a guide member 43 made fast to the flooring, and this guide 43 is surmounted by a permutation lock structure like that shown and described with reference to the preceding figures and therefore requires no special description.

In this application there are shown and described certain structures similar to some structures set forth in companion applications filed by me on even date herewith for "an automobile lock" and for a "steering wheel lock for automobiles."

What is claimed is:—

1. In a lock for automobiles provided with a steering post or spindle and a steering wheel carried by and secured to the steering post, a lock structure mounted on the steering column and associated with the steering post and wheel for securing them to and releasing them from a fixed part of the steering assembly, said lock structure comprising a core surrounding and concentric with the steering post and fast to a fixed part of the structure and also provided with a longitudinal groove or seat and oppositely disposed longitudinal series of spaced lugs and having an outstanding flange at one end and a threaded extension at the other end, a series of alternately arranged rings and rotatable tumblers in coactive relation and surrounding the core, with the rings engaged and held against rotation by the spaced lugs on the core and the tumblers being rotatable about the core in the spaces between the lugs, a slidable lock bolt traversing the tumblers and rings lengthwise of the core and provided with a longitudinal series of spaced lugs engaging and anchoring the rings, with the spaces between the lugs traversed by the tumblers, and the steering wheel having keepers for holding the lock bolt when moved thereinto.

2. In a lock for automobiles provided with a steering post or spindle and a steering wheel carried by and secured to the steering post, a lock structure mounted on the steering column and associated with the steering post and wheel for securing them to and releasing them from a fixed part of the steering assembly, said lock structure comprising a core surrounding and concentric with the steering post and fast to a fixed part of the structure and also provided with a longitudinal groove or seat and oppositely disposed longitudinal series of spaced lugs and having an outstanding flange at one end and a threaded extension at the other end, a series of alternately arranged rings and rotatable tumblers in coactive relation and surrounding the core, with the rings engaged and held against rotation by the spaced lugs on the core and the tumblers being rotatable about the core in the spaces between the lugs, a slidable lock bolt traversing the tumblers and rings lengthwise of the core and provided with a longitudinal series of spaced lugs engaging and anchoring the rings, with the spaces between the lugs traversed by the tumblers, and the steering wheel having keepers for holding the lock bolt when moved thereinto, each anchored ring having a central passage with two diametrically opposite slots or recesses in the edge thereof, and a third slot or recess for the lock bolt in spaced relation to both of the first named slots.

3. In a lock for automobiles provided with a steering post or spindle and a steering wheel carried by and secured to the steering post, a lock structure mounted on the steering column and associated with the steering post and wheel for securing them to and releasing them from a fixed part of the steering assembly, said lock structure comprising a core surrounding and concentric with the steering post and fast to a fixed part of the structure and also provided with a longitudinal groove or seat and oppositely disposed longitudinal series of spaced lugs and having an outstanding flange at one end and a threaded extension at the other end, a series of alternately arranged rings and rotatable tumblers in coactive relation and surrounding the core, with the rings engaged and held against rotation by the spaced lugs on the core and the tumblers being rotatable about the core in the spaces between the lugs, a slidable lock bolt traversing the tumblers and rings lengthwise of the core and provided with a longitudinal series of spaced lugs engaging and anchoring the rings, with the spaces between the lugs traversed by the tumblers, and the steering wheel having keepers for holding the lock bolt when moved thereinto, each anchored ring having a central passage with two diametrically opposite slots or recesses in the edge thereof, and a third slot or recess for the lock bolt in spaced relation to both of the first named slots, and each tumbler having a central passage with two diametrically opposite slots or recesses to pass the lugs on the core with one of the recesses adapted to pass the lock bolt.

4. In a lock for automobiles provided with a steering post or spindle and a steering wheel carried by and secured to the steering post, a lock structure mounted on the steering column and associated with the steering post and wheel for securing them to and releasing them from a fixed part of the steering assembly, said lock structure comprising a core surrounding and concentric with the steering post and fast to a fixed part of the structure and also provided with a longitudinal groove or seat and oppositely disposed longitudinal series of spaced lugs and having an outstanding flange at one end and a threaded extension at the other end, a series of alternately arranged rings and rotatable tumblers in coactive relation and surrounding the core, with the rings engaged and held against rotation by the spaced lugs on the core and the tumblers being rotatable about the core in the spaces beween the lugs, a slidable lock bolt traversing the tumblers and rings lengthwise of the core and provided with a longitudinal series of spaced lugs engaging and anchoring the rings, with the spaces between the lugs traversed by the tumblers, and the steering wheel having keepers for holding the lock bolt when moved thereinto, each anchored ring having a central passage with two diametrically opposite slots or recesses in the edge thereof, and a third slot or recess for the lock bolt in spaced relation to both of the first named slots, and each tumbler having a central passage with two diametrically opposite slots or recesses to pass the lugs on the core with one of the recesses adapted to pass the lock bolt, with the last namel slot or recess larger than the diametrically opposite slot or recess.

5. A steering wheel lock structure, including permutation tumblers with a circular series of teeth or serrations, and a lock bolt with notches traversed by the tumblers, with the tumblers having recesses in turn traversed by the lock bolt, one side wall of each of said notches being V-shaped to provide edges spaced apart and normally in engagement with said serrations to give the impression to one rotating the tumbler of numerous points of engagement between the tumbler and the lock bolt for the distance travelled by the rotatable tumbler, whereby the sense of the width of the recesses in the tumbler is wholly lost.

In testimony that I claim the foregoing as my own, I have hereto affixed my signature.

GILBERT LINCOLN BAKER.